United States Patent

Forster

[15] 3,646,789
[45] Mar. 7, 1972

[54] NONDESTRUCTIVE TESTING SYSTEM

[72] Inventor: Friedrich M. O. Forster, Der Schoene Weg 144, 741 Reutlingen, Germany

[22] Filed: July 22, 1969

[21] Appl. No.: 843,439

[52] U.S. Cl.....................................72/10, 72/703, 72/324, 83/371
[51] Int. Cl.................B21b 37/00, B21d 43/28, B26d 5/38
[58] Field of Search................................72/10, 703; 83/371

[56] References Cited

UNITED STATES PATENTS

| | | | |
|---|---|---|---|
| 2,797,753 | 7/1957 | Bornemann | 83/371 X |
| 3,101,633 | 8/1963 | Klasek | 72/703 |
| 3,373,584 | 3/1968 | Rundt | 72/10 |

Primary Examiner—Charles W. Lanham
Assistant Examiner—R. M. Rogers
Attorney—Dan R. Sadler

[57] ABSTRACT

A system and method are disclosed for nondestructively testing materials such as wires, rods, bars, etc., while they are very hot (for example red hot or even white) and to mark and/or separate any defective segments of the material.

5 Claims, 6 Drawing Figures

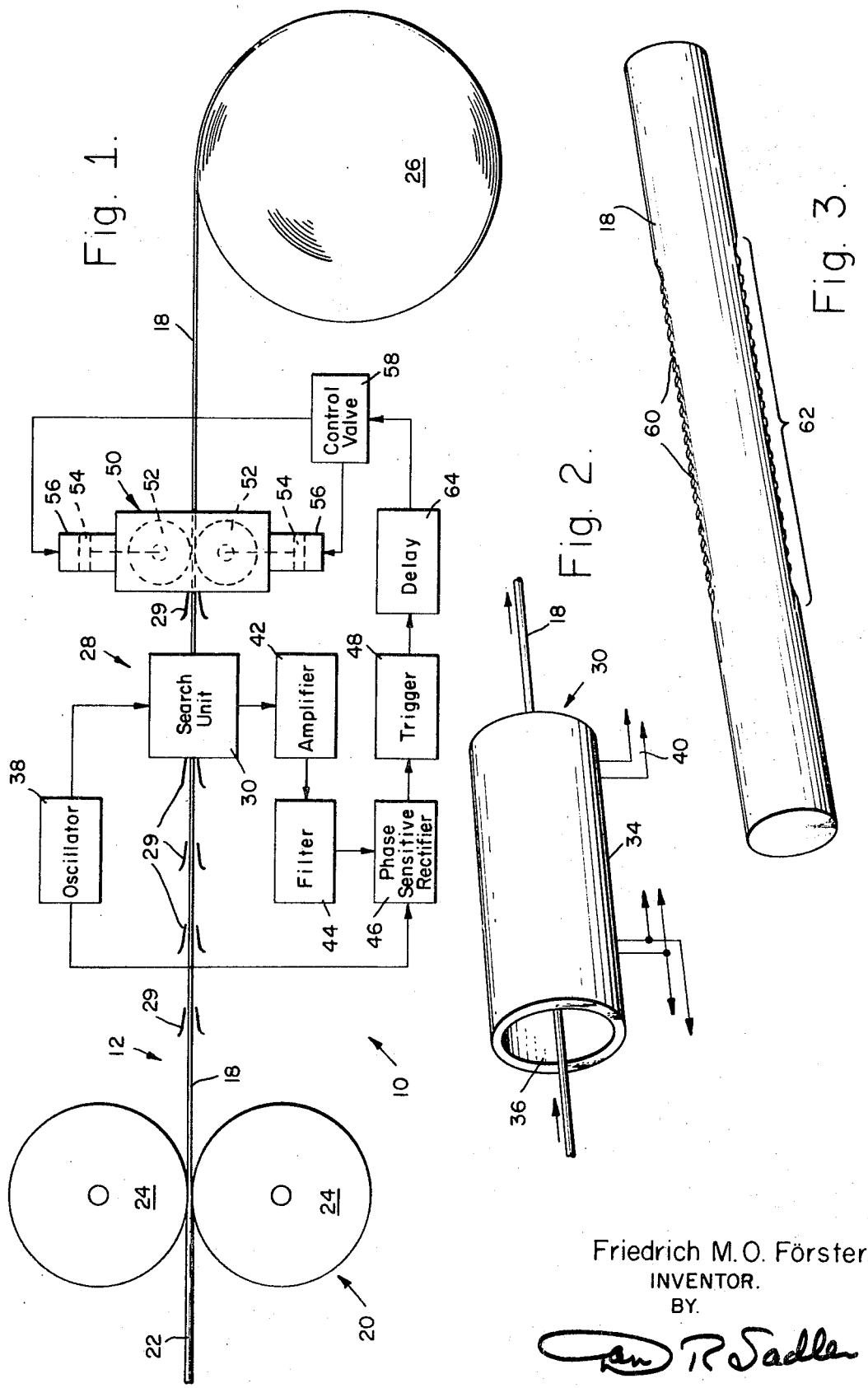

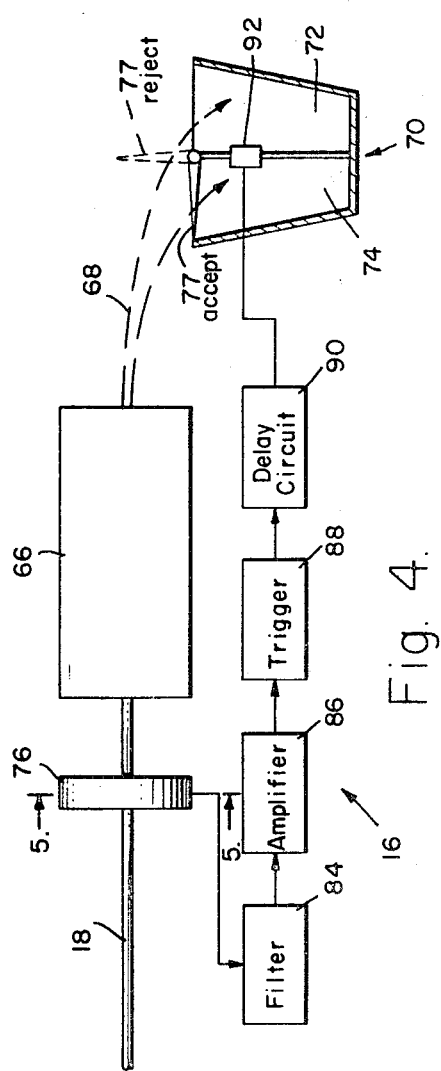
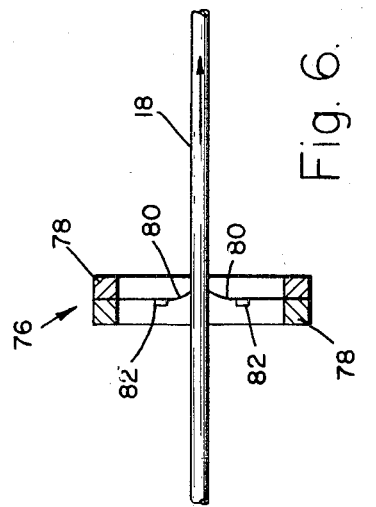
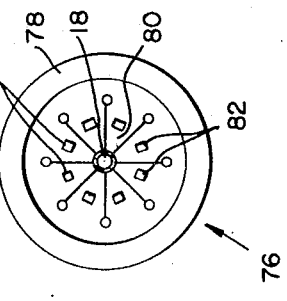
Fig. 4.
Fig. 5.
Fig. 6.
Friedrich M.O. Förster,
INVENTOR.
BY.
ATTORNEY.

NONDESTRUCTIVE TESTING SYSTEM

BACKGROUND OF THE INVENTION

It is becoming increasingly more important to nondestructively inspect materials, semifinished parts and finished products. If defects are found in an early phase of the production process less time, labor and materials are invested in making a part before it is found defective. Also, if there is an irregularity in the production process, identifying defective parts at the point of irregularity insures the process being corrected before a significant number of defective parts are produced.

For example, materials such as wires, bars, rods, pipes, etc., may be used to form semifinished or finished products, such as lamp filaments, ball bearings, bushings, etc. It is desirable to inspect the wire, etc., before any production operations are performed. In fact, it is desirable to inspect the wire, etc., as it is being formed. This inspection should preferably be a part of the production, for example, during or immediately after the final rolling, drawing, extruding, etc., operation. This permits faster inspection with less handling and insures an immediate detection of a faulty process or source material.

If the final operation is a hot one the wire, etc., at this point will be red hot or may be even white hot. This means the wire, etc., is easily handled and is also above the Curie temperature. The term Curie temperature as used herein means that temperature at which a ferrous material loses all or substantially all of its ferromagnetic characteristics. Moreover, the electrical conductivity of the material is reduced to a relatively low level.

This means the so-called eddy current type of testing can be employed. Because of the low permeability and conductivity, higher frequencies can be used whereby higher inspection speeds are possible. Also the skin effect is reduced and much penetration into the material is possible.

Although it is desirable to perform the inspection operation at this point in the process, numerous difficulties are presented. First of all in the case of products such as wire the product is produced by a continuous process in unbroken lengths and is normally stored on a spool, etc. As a result if a defect is detected it is not practical to cut out the relatively small segments containing the defects. This would interfere with and disrupt the process and complicate the subsequent handling. As an alternative it has been proposed to somehow mark the defective segments, for example, by spray painting, etc. Although this may be possible when a material is cold, it is virtually impossible to do so when it is hot. It is also very difficult, if not impossible, to subsequently detect this type of marking and eliminate the defective segments. As a consequence, heretofore it has not been practical to test materials at elevated temperatures and derive the full benefits therefrom.

SUMMARY

The present invention provides means for overcoming the foregoing difficulties. More particularly, the present invention provides means for continuously inspecting materials such as wires, etc., during its production and particularly while they are hot. In the embodiment of the invention shown herein this is accomplished by providing an eddy current test system with a search unit disposed at a point immediately downstream from the final hot rolling, extruding, etc. If any defects are detected some form of apparatus, such as knurled rollers, etc., are actuated to mark the exterior surface of any segments which contain defects. Since the wire is at an elevated temperature the surface can be very easily marked to form a gross defect which can be subsequently detected by a simple detection means.

DESCRIPTION OF THE DRAWINGS

FIG. 1 is a view of a first portion of a system embodying one form of the present invention and adapted to be used with a first part of a production process;

FIG. 2 is a view of the search unit used in the portion of the system shown in FIG. 1;

FIG. 3 is a perspective view of a portion of the product produced by the system;

FIG. 4 is a view of a second portion of the system adapted to be used with a second part of a production process;

FIG. 5 is an end view (taken substantially along the plane of line 5—5 in FIG. 4) of a search unit employed in the second portion of the system; and FIG. 6 is a cross-sectional view of the search unit of FIG. 5.

Referring to the drawings in more detail, the present invention is embodied in a nondestructive testing system 10 especially intended for use as a part of a production process or line 12. This production line 12 includes a first portion 14 (FIG. 1) for performing one or more operations and a second portion 16 (FIG. 4) for performing one or more additional operations.

The first portion 14 is particularly adapted to continuously produce a relatively small diameter wire 18 in substantially unlimited lengths. A first work station 20 is provided for receiving a partially finished member and performing an operation thereon. The present partially finished member is an oversized bar or wire 22. The operation transforms this member 22 into finished wire 18 of the correct diameter. In the present instance a pair of rollers 24 are provided for hot rolling the bar or oversized wire 22 into the fine wire 18. A die for drawing the wire 22 or any other suitable equipment may be employed if desired.

The finishing and sizing operation is performed while the wire 22 is at an elevated temperature (i.e., red or even white hot) whereby it is soft and ductile and easy to form. After the foregoing operation, the wire 18 is wrapped onto a spool 26 for storage and/or subsequent processing. It is to be noted this entire operation is performed at a relatively high rate of speed and on a continuous basis. Moreover, the entire length of the fine wire 18 is wrapped onto the spool 26 without any cuts, breaks, or interruptions.

An inspection station 28 is disposed between the first work station 20 and the spooling station 26. If the wire 18 has a relatively small diameter and is traveling at a high rate of speed, one or more guides 29 may be provided for preventing the wire 18 from gyrating during its travels, particularly as it approaches and passes through the inspection station 28. For reasons which will be explained subsequently the inspection station 28 is preferably located sufficiently close to rollers 20 to insure the wire 18 still being at or very nearly at the elevated rolling temperature. Normally this is in the red or white hot range, i.e., 1,100° to 1,500 °F. and above the Curie point. At this temperature the material will have very little, if any, ferromagnetic characteristics and the permeability will be in the region of about 1. Also the electrical conductivity of the material will be greatly reduced. For example, it will be in a region of about 8m./$\Omega$mm.$^2$ to about 1m./$\Omega$mm.$^2$.

The inspection station 28 includes a search unit 30 for scanning the wire 18 as it passes through the inspection station 28. The construction and operation of the search unit 30 will, of course, be dependent upon the nature of the testing system, the types of defects which are being sought, etc.

By way of example, in the present instance a so-called eddy current system is employed. In a system of this nature an alternating magnetic field is radiated into the workpiece whereby eddy currents are created in the workpiece. If any irregularities are present in the workpiece, corresponding irregularities will be produced in the eddy currents. By detecting the irregularities in the eddy currents, the irregularities in the workpiece can be identified.

The present unit 30 includes a coil 34 for radiating a magnetic field into the wire 18 and creating eddy currents therein. Although the coil 34 may be of any desired nature, in the present instance it is wound in a cylinder with an axial opening 36 whereby the wire 18 can travel axially therethrough.

The coil 34 is coupled to an oscillator for circulating the driving current therethrough. The frequency of the field should be sufficiently high to insure resolving even the smallest objectionable defects and also to permit inspecting at a high rate of speed. However, it should be low enough to permit the field and resultant eddy currents to reach all of the regions to be tested. Since the wire 18 is hot and above the Curie point, it will have a permeability in the region of unity and a relatively low conductivity. Accordingly, even though the frequency may be relatively high, the field will extend into the middle or axis of the wire 18 and create eddy currents throughout its entire interior. As a result the present system is capable of resolving even the smallest defect anywhere in the wire.

The output of the search unit 30 is coupled to a suitable defect detection system. In the present instance the search unit 30 includes a second coil with the leads 40 which is responsive to the eddy currents. The leads 40 are coupled to an amplifier 42, filter 44, phase-sensitive rectifier 46 driven from the oscillator 38 and a trigger 48. These all cooperate with each other in a conventional manner to produce a signal at the output of the rectifier 46 which exceeds a predetermined level when a defect in excess of a predetermined level is present. When a signal of this magnitude occurs the trigger 48 will be actuated for so long as the signal persists. The output of the trigger 48 is coupled to a suitable marking device 50. The marking device 50 is disposed immediately downstream from the search unit 28. Although the spacing is not believed to be particularly critical, it is preferably relatively small. Since the temperature of the wire 18 at the location of the marking device 50 is still very high it is extremely difficult, if not impossible, to effectively apply paint, etc. However, the wire 18 is relatively soft and easily deformable. The present marking device 50 is therefore effective to mark the wire 18 by physically deforming it.

The markings may be of any suitable character. However, they should normally not be of such a nature as to decrease the strength of the wire 18 to a level where breakage is likely as it is intended to continue the process uninterrupted at this point.

By way of example, in the present instance a pair of opposed rollers 52 are disposed on the opposite side of the wire 18. The rollers 52 are mounted on a pair of movable supports (such as the pistons 54 and cylinders 56) whereby they may travel between a retracted position and an extended position. Although the pistons 54 may be actuated by any suitable means, in this embodiment a fast acting pneumatic control valve 58 is provided for filling and emptying the pneumatic cylinders 56.

When the rollers 52 are retracted their running surfaces are just out of contact with the wire 18. However, when the control valve 58 fills the cylinder 56 both of the rollers 52 are extended whereby their running surfaces engage the opposite sides of the wire 18. The running surfaces include some irregularities such as a knurling, corrugation, etc., whereby corresponding indentations, irregularities 60, etc., are permanently imprinted upon the opposite sides of the wire 18. These indentations may be on the order of a few tenths of a millimeter, whereby they will represent a very gross, obvious and permanent defective zone which can be very easily subsequently identified.

Since the wire 18 at this point is still very hot and reasonably soft, very little pressure is required for extending the rollers 52 against the wire 18. It is also desirable for the rollers 52 to be driven synchronously with the wire 18 as this will avoid any slipping or dragging on the wire which might otherwise cause it to break.

The marking rollers 52 are spaced a short distance behind the search unit 30. If the rollers 52 are extended the instant the search unit 30 senses a defective segment 62 entering the search unit 30, the markings 60 will be imprinted upon an acceptable section of wire having a length equal to the distance between the search unit 30 and the rollers 52. Also, if the rollers 52 are retracted the instant the defective segment 62 leaves the search unit 30 a defective segment of the same length will remain unmarked.

Although the first condition may be somewhat wasteful, under some circumstances it may be desirable to reject a small section of good wire 18 in front of and behind defective segment 62. This insures all of the bad material being disposed of.

However, the second condition (i.e., not marking the terminal portion of the defective segment 62) will normally be very objectionable as it could result in the acceptance of defective material.

In order to avoid this difficulty a suitable time delay 64 may be provided between the trigger 48 and the control valve 58. The duration of the delay is approximately equal to the transit time for the wire 18 to traverse the distance from the search unit 30 to the rollers 52. This delay may be inherently built into the actuating pneumatic device or as in the present instance, an electronic delay circuit 64 may be provided. Ideally the time delay for extending the rollers 52 should be just slightly less than the transit time whereas the time delay for retracting the rollers 52 should just be slightly longer. This will insure the markings being applied from just in front of the defective segment 62 to just beyond its end.

The operation of the portion 14 of the system 10 shown in FIGS. 1, 2 and 3 can be briefly summarized as follows. The wire 18 is continuously formed to its final dimension by the rollers 24 in a high speed operation. The wire 18 is then inspected as it passes through the search unit 30 for the smallest defects. Since the wire 18 is at an elevated temperature and has a very low permeability and conductivity, this can be performed reliably at a high rate of speed. Any defective segments 62 in the wire 18 are then accurately and permanently marked by the rollers 52. The wire 18 including the marked segments 62 is then stored in a continuous unbroken length on the spool 26 ready for subsequent use. However, since all of the defective segments 62 of the wire 18 are conspicuously marked with what constitutes gross defects it is easy to avoid using any defect segments.

The second portion 16 (FIG. 4) of the production line 12 is particularly adapted to receive the inspected output from the first portion 14 and perform one or more additional operations thereon. The present portion 16 includes means for receiving the spool 26, stripping the inspected wire 18 from the spool 26 and feeding it through a work station 66. The work station 66 usually cuts, chops, etc., the wire 18 into a plurality of smaller pieces. These pieces are then formed into finished or semifinished products, such as ball bearings, filaments for incandescent lamps, etc. After the products are formed they are discharged from the work station 66 whereby they follow along a predetermined trajectory 68 into a storage bin 70. The bin 70 is divided into two separate sections, section 72 for good parts and section 74 for bad parts.

A sorting gate is provided in the trajectory 68 for separating the good items from the bad. This gate 77 is movable between an elevated position and a retracted position. When the gate 77 is retracted as shown the parts are deflected into the accept section 72. However, when the gate 77 is raised into the elevated position it will deflect the parts downwardly into the reject section 74.

In order to sense the defective segments 62 of the wire 18 a search unit 76 is provided just ahead of the work station 66. As described above all of the defective segments of the wire 18 have been marked by the rollers. Since these markings 60 amount to very large and gross surface defects they are very simple and easy to detect. Accordingly, the search unit 76 may be a very simple device.

In the present instance the search unit 76 includes a pair of rings 78 which are positioned concentrically about the wire 18. A plurality of reed type feelers 80 have their radially outer ends clamped between the rings 78. The inner ends are positioned so as to engage the surface of the wire 18 and slide therealong.

Normally the surface of the wire 18 will be fairly smooth. However, it will contain some irregularities which cause the feelers 80 to vibrate slightly. However, such vibrations will be of a relatively low amplitude and irregular frequency.

In contrast when a defective segment 62 having the corrugated markings 60 thereon passes through the search unit 76 at least some of the feelers 80 will ride over the corrugations 60. The corrugations 60 are fairly uniformly spaced and the wire 18 is traveling at a fairly uniform velocity. As a consequence the reeds 80 will always vibrate at substantially the same frequency. This frequency is selected to be entirely different and distinct from the normal vibrations.

A plurality of transducers 82 are mounted on or coupled to the feelers 80 so as to be responsive to the vibrations. These transducers 82 are effective to generate signals corresponding to the vibrations of the feelers 80 and particularly those vibrations created by the corrugations 60 from the markers.

The transducers 82 are in turn coupled to a filter 84 having a pass band which includes the frequency at which the reeds 80 vibrate when the corrugations 60 are passing through the search unit 76. This will suppress the random noises, etc., created by the sliding. An amplifier 86 is coupled to the output of the filter 84 and to the input of a trigger 88. Normally the signal from the amplifier 86 is too low to set the trigger 88. However, when the feelers 80 are riding over the corrugations 60, the signals will be large enough to exceed the threshold level and set the trigger 88.

The output of the trigger 88 is coupled to the control 92 for the gate 77. When the trigger 88 is not set the gate 77 will remain in the lowered position whereby the parts are deflected into the accept bin 72. However, if the trigger 88 is set the gate 77 will be raised whereby the parts are deflected into the reject bin 74.

It can be appreciated there may be a considerable delay between the time the corrugations 60 pass through the search unit 76 and the corresponding defective parts are ejected from the work station 66. To avoid missorting a time delay circuit 90 may be provided between the trigger 88 and the control 92.

What is claimed is:

1. Apparatus for manufacturing a plurality of smaller parts from a continuous wirelike member, said apparatus including the combination of
   an inspection station,
   means for continuously feeding said wirelike member through said inspection station while the temperature of said member is above the Curie point,
   a pickup probe in said inspection station adapted to scan said wirelike member while the temperature thereof is above the Curie point and sense any defective portions,
   said pickup probe including cylindrical coil means through which the said wirelike member passes in spaced relation thereto, said coil means being effective to induce eddy currents in said wirelike member and to sense changes in the eddy currents produced by defective portions in said wirelike member,
   marking means coupled to said pickup probe, said marking means being effective to permanently mark any defective portions of said wirelike member while the temperature thereof is above the Curie point, and
   means for storing the continuous wirelike member including the marked defective portions.

2. Apparatus for manufacturing a plurality of smaller parts from a continuous wirelike member, said apparatus including the combination of
   an inspection station,
   means for continuously feeding said wirelike member through said inspection station while the temperature of said member is above the Curie point,
   a pickup probe in said inspection station adapted to scan said wirelike member while the temperature thereof is above the Curie point and sense any defective portions,
   marking means coupled to said pickup probe, said marking means being effective to permanently mark any defective portions of said wirelike member while the temperature thereof is above the Curie point,
   means for storing the continuous wirelike member including the marked defective portions,
   means for removing said continuous wirelike member from said storage means,
   a second pickup adapted to engage said continuous wirelike member as it is removed from the storage means, said pickup means being adapted to slide upon said member and sense the passage of said permanently marked portions,
   means for subdividing said continuous wirelike member into a plurality of smaller parts, and
   sorting means coupled to said second pickup, said sorting means being effective to separate any of said parts which were marked by the marking means from any of said parts which were not so marked.

3. The manufacturing apparatus of claim 2 wherein
   said marking means includes a pair of wheels which engage the opposite sides of the wirelike member and form a series of permanent knurlings in the surface thereof, and
   the second pickup includes a reed which slides upon the wirelike member and vibrates when said knurling passes therethrough.

4. Apparatus for manufacturing a plurality of smaller parts out of a continuous, elongated, semifinished member, said apparatus including the combination of
   a work station for performing a first operation on a semifinished member while the temperature of said member is above the Curie point,
   an inspection station,
   means for continuously feeding said semifinished member through said inspection station while the temperature thereof is still above the Curie point,
   a first pickup probe in said inspection station adapted to scan said semifinished member while the temperature is still above the Curie point and to sense any defective portions,
   marking means coupled to said first pickup probe, said marking means including a pair of rollers having irregular surfaces and being effective to engage the opposite sides of the semifinished member and form permanent knurled deformation marks in said semifinished member while it is above the Curie point in the region of the defective portions,
   means for storing the semifinished member including the marked defective portions,
   means for removing said semifinished member from said storage means after the temperature of said member has been reduced to ambient,
   a second pickup adapted to scan said semifinished member as it is removed from the storage means, said pickup means being adapted to scan by sliding upon the surface of the semifinished member and engage the knurled deformations to thereby sense the passage of said permanently marked portions,
   means for dividing said semifinished member into a plurality of smaller parts, and
   sorting means coupled to said second pickup, said sorting means being effective to separate any of said parts which were not so marked.

5. The manufacturing apparatus of claim 4 wherein
   said marking means is spaced a predetermined distance from said pickup probe whereby it takes a predetermined transit time for the semifinished member to travel from the pickup probe to the marking means,
   delay means coupling the pickup means to the marking means, said delay means having a delay time equal to said transit time whereby a defective portion sensed by the pickup probe will arrive at the marking means substantially simultaneously with its actuation by the pickup probe, and
   the pickup means includes a cylindrical coil means which surrounds the semifinished member as it passes therethrough, said coil means being in spaced relationship to the semifinished member and effective to induce eddy currents therein.